United States Patent [19]

Gill et al.

[11] 3,878,409

[45] Apr. 15, 1975

[54] EXPLOSIVELY DRIVEN ELECTRIC POWER GENERATION SYSTEM

[75] Inventors: Stephen Paschall Gill, Atherton; Dennis Willard Baum, Berkeley, both of Calif.

[73] Assignee: Artec Associates Incorporated, Hayward, Calif.

[22] Filed: June 21, 1973

[21] Appl. No.: 372,336

[52] U.S. Cl. .................................. 310/11; 89/8
[51] Int. Cl. ............................................ H02n 4/00
[58] Field of Search ......... 89/8; 307/106; 310/4, 10, 310/11, 12

[56] References Cited
UNITED STATES PATENTS

| | | | |
|---|---|---|---|
| 3,225,227 | 12/1965 | Biehl | 310/11 |
| 3,317,763 | 5/1967 | Brumfield | 310/11 |
| 3,348,079 | 10/1967 | McKinnon | 310/11 |
| 3,368,088 | 2/1968 | Krzycki et al. | 310/11 |
| 3,374,668 | 3/1968 | Godfrey | 89/8 X |
| 3,449,600 | 6/1969 | Holzman et al. | 310/11 |
| 3,478,231 | 11/1969 | Knoepfel et al. | 310/10 |
| 3,508,086 | 4/1970 | Allport et al. | 310/11 |
| 3,622,817 | 11/1971 | Isaacson | 310/11 |

*Primary Examiner*—Donovan F. Duggan
*Attorney, Agent, or Firm*—Owen, Wickersham & Erickson

[57] ABSTRACT

An explosive driver transfers the stored chemical energy of an explosive to a dynamic flow stream of a gas for generating electrical power in a magnetohydrodynamic generator. The explosive is in the form of an elongated core disposed within a container and spaced from the inner surfaces of the container. A sealing strip is positioned on the outside surface of the explosive core, and the space between the core and the inside surface of the container is filled with the gas. Detonation along the length of the core expands the sealing strip progressively outwardly and impacts it into sealing engagement with the related inside surface of the container. This compresses the gas and forms a shock wave which fully ionizes the gas to an electrically conductive state. The gas flow stream is further processed by a settling chamber and a nozzle before being directed through the magnetohydrodynamic generator to convert the gas flow to electrical energy.

28 Claims, 10 Drawing Figures

EXPLOSIVELY DRIVEN ELECTRIC POWER GENERATION SYSTEM

Some of the inventions herein described were made (first reduced to practice) in the course of or under a contract with the Department of the Army.

BACKGROUND OF THE INVENTION

This invention relates to explosive drivers and electric power generating systems and in particular to an explosive driver and gas processor for the magnetohydrodynamic method of electric power generation.

Explosive drivers are devices for converting the energy of explosive detonations into useful gas dynamic energy.

Explosive drivers were first developed in 1964 and have since found numerous applications, primarily in the simulation of high energy effects such as ballistic missiles and meteoroids.

The magnetohydrodynamic (MHD) method of electric power generation is based on the principle of passing a conducting fluid through a magnetic field. As the conducting fluid passed through the magnetic field, the energy of the flow is converted directly into electrical power. In an MHD electrical generator the moving conducting gas flow acts like the moving copper coil of a conventional generator. The MHD method has distinct advantages over other forms of power generation. It is much more efficient in the conversion of thermal energy to electrical energy, and large power levels can be obtained with small generators. While the theory, techniques and technology of individual processes of MHD have been developed and tested, and while excellent results have been obtained in laboratory systems, the MHD method has failed to reach the stage of a real breakthrough in spite of extensive development work during a period of more than 30 years.

The major problem in the MHD method is the difficulty of getting the gas conductive. The research that has been done to date has indicated that the working gas can be made sufficiently electrically conductive only by thermal ionization stable only at high temperatures. Other techniques, such as increasing the electron temperature, ionization by particle radiation, ionization by photon radiation and ionization by short-duration high-intensity fields, have not proved practical. Reliable stability has been exhibited only by equilibrium thermal ionization.

Prior attempts to achieve the necessary ionization have included heating the gas to combustion temperatures or detonation temperatures, which typically run 2,000°–3,000°K. At these temperatures a normal gas does not ionize. The prior art techniques have therefore tried seeding the gas with an ionizable substance. This has produced only limited conductivity which, even under the best conditions, has been far less than that required. Because of the low conductivity, the prior art devices for MHD electrical power generation have necessarily been quite large and not portable or compact.

SUMMARY OF THE INVENTION

It is a primary object of the present invention to combine an explosive driver with a MHD generator in a way that overcomes the problems of the prior art. It is a closely related object to construct an explosive driver system which efficiently transfers the energy of high explosives to a working gas to yield very high temperatures and consequently very high electrical conductivity.

It is another object of the present invention to further process the gas produced by the explosive driver by means of a settling chamber and nozzle assembly to provide control over the velocity, pressure, flow duration, power level and other important properties of the energized working gas.

It is a still further object of the present invention to provide a MHD generator which is completely self-contained and requires no external source of magnetic field or capacitor banks.

The explosive driver of the present invention transfers the explosive energy to a separate gas rather than using the gases produced by the explosive itself. The explosive is formed as an elongated core and is positioned within a container in spaced relation to the inside surfaces of the container. A sealing material or flyer strip is placed on the surface of the explosive and the space between the sealing material and the inside surface of the container is filled with the gas to be compressed and ionized. The explosive is positioned inside the gas so that the explosive forces move outwardly to compress the gas against the inner surface of the container.

This arrangement concentrates the energy of the high explosive into a very small mass of the gas and yields a very highly ionized gas at high energy conversion efficiencies when the explosive core is detonated. The core is ignited at one end and detonates progressively along the length of the core. As this occurs the sealing material is progressively forced outward and impacted into sealing engagement with the inside surface of the container. This compresses the gas and produces a shock wave in the gas. All of the gas behind the shock is ionized. The compressed and ionized gas is then collected and stagnated in a settling chamber where the velocity is brought essentially to zero. A temporary seal is provided to maintain a selected working pressure. The energized gas is then expanded from the settling chamber through a nozzle and directed into a magnetohydrodynamic channel. The electrically conductive gas flow provides mechanical power for the generation of electrical power. The nozzle controls the flow rate of the gas and thus the duration of the power flow.

An initial magnetic field in the MHD channel is provided by permanent magnets or remanent magnetism in a steel structure, and this generates power which is fed back to the field coil to build up the magnetic field. The generator thus builds up its own field and the field build-up process takes a very short time, depending on the generator design. Once the field build-up has been accomplished, the generator supplies full electrical power to a load for the duration of the gas flow.

The power is generated in pulses in most instances in accordance with the present invention, but individual explosive cores can be fired repetitively in sequence to produce continuous power.

Apparatus and methods which incorporate the structure and techniques described above and which are effective to function as described above constitute specific objects of this invention.

Other objects, advantages and features of my invention will become apparent from the following detailed description of one preferred embodiment taken with the accompanying drawings.

BRIEF DESCRIPTION OF THE DRAWINGS

FIG. 3 illustrates how a plug of sealing material is used with a settling chamber to provide a temporary gas seal;

DESCRIPTION OF THE PREFERRED EMBODIMENTS

Figure 1:
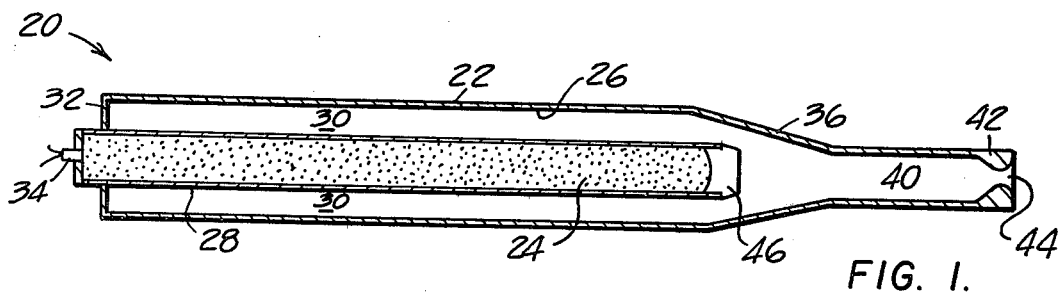
FIG. 1 is a side elevation view in cross-section of an explosive driver constructed in accordance with one embodiment of the present invention.

An explosive driver constructed in accordance with one embodiment of the present invention is indicated generally by the reference numeral 20 in FIG. 1.

The explosive driver 20 has a cylinder outer container or cartridge 22. The container or cartridge 22 shown in FIG. 1 is a disposable cartridge and may be formed from almost any ductile material. For example, copper, steel or plastics such as polyvinyl chloride can be used.

An elongated core of exposive 24 is centrally positioned within the interior of the cylindrical container 22 and is spaced from the inside surface 26 of the container 22. The cylindrical core is positioned within the container or cartridge 22 by small struts or other positioning devices which are not illustrated.

A flyer tube 28 of sealing material envelopes the cylindrical core 24. The flyer tube 28, in the cylindrical form shown in FIG. 1, is a ductile tube that will not shatter or fragment. This tube can also be made from a variety of ductile materials such as metals and plastics. In other embodiments of the present invention, as will be described in greater detail below, non-ductile sealing materials including glass, can be used. The space between the flyer tube 28 and the inside surface 26 is filled with a gas 30. The gas 30 may be pressurized above ambient.

A frangible diaphram 44 closes the foreward end of the container 22 when the gas 30 is pressurized.

A wall 32 closes the rear end of the explosive driver 22.

An igniter 34 is connected to the outer end of the cylindrical explosive core 24.

The cylindrical container 22 has a forward converging section 36 which is connected to the inlet of a settling chamber 40. The settling chamber collects the compressed and ionized gas at stagnation pressure where the velocity is brought essentially to zero.

The outlet end of the settling chamber 40 is connected to a nozzle assembly 42. The nozzle assembly 42 may preferably include a converging-diverging nozzle as illustrated.

The compressed and ionized gas is stored temporarily in the settling chamber 40 and is released through the nozzle assembly 42 at a controlled rate which is dependent on the construction of the nozzle assembly.

Figure 3:
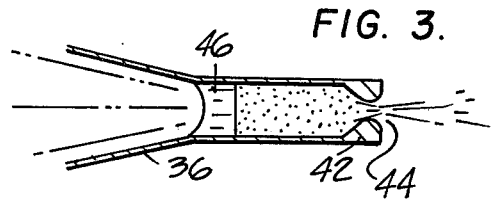
FIG. 3 is a view like FIGS. 1 and 2 and shows the driver after the explosive core has been fully detonated.

A sealing 46 is located at the end of the explosive core 24 for extrusion into the inner end of the settling chamber 40 to form a tempory gas seal as shown in FIG. 3. A plastic material can be used for the sealing plug 46. The material for this plug is not critical.

As noted in the introduction to this application, and as will be described below with reference to FIG. 4, the explosive driver 20 is especially adapted for use with a magnetohydrodynamic (MHD) electrical generator 60. However before describing the construction and operation of the MHD generator 60, the operation of a specific embodiment of the explosive driver 20 will be reviewed.

Figure 2:
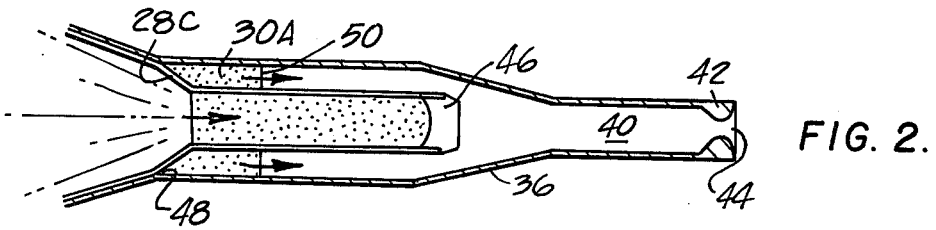
FIG. 2 is a view like FIG. 1 and shows the explosive driver after the explosive core has been partially detonated.

The operation of the explosive driver 20 is initiated by energizing the igniter 34. This causes the cylindrical explosive core 24 to detonate progressively along the length of the core. As illustrated in FIG. 2, this detonation of the explosive core forces a part 28C of the flyer tube outwardly in the cone shaped configuration illustrated in FIG. 2 and impacts the flyer tube into annular sealing contact at 48 with the inside surface 26 of the container 22. This moving gas seal compresses the gas 30 in front of the cone 28C and produces a shock wave 50 in front of the moving seal 48. The gas in the region 30A behind the moving shock wave 50 is highly compressed.

In the FIG. 1 embodiment the shock wave is a constant velocity shock wave. The pressure behind the shock is constant, and all of the gas in the region 30A behind the shock is fully ionized. The thermodynamic state of the shock compressed gas in the region 30A is determined by the composition of the gas, the initial loading pressure, and the detonation characteristics of the explosive. Any gas (such as air, argon, carbon dioxide, etc.) or any explosive (such as, PETN, RDX, nitromethane, etc.) may be used, depending on engineering and cost considerations for particular embodiments of the invention.

In a particular embodiment of this invention dry air at an initial pressure of 145 psi and composition C4 explosive (91% RDX and 9% inert plasticizer) are used. For this specific embodiment the pressure of the compressed gas is 10,000 atmospheres, the temperature is 12,000 K and the stagnation internal energy is 15,300 calories/gram. The explosive core will fully detonate within 40 microseconds for a one foot long core of composition C4, and the gas 30 is accelerated to a speed of 8,000 meters per second. At these conditions dissociation, ionization, and interatomic forces are important, and a full thermodynamic equation of state must be used in the analysis of the driver. While this analysis can be performed using accepted analytical procedures, such an analysis is not required for a disclosure of the present invention and will not be presented in this application.

The highly ionized gas flow existing after detonation of the core is directed through the converging section 36 into the settling chamber 40.

The sealing plug 46 is accelerated by the explosive and is extruded into the inner end of the settling chamber, as illustrated in FIG. 3, to act as a temporary gas seal for the stagnated gas in the chamber. Other forms of gas sealing may also be used for different configurations of the explosive assembly.

The volume of the settling chamber together with the mass and energy of gas injected by the explosive assembly determine the chamber pressure. The volume is chosen to provide a pressure within the structural limits of the chamber. Since the stagnation process is isoenergetic, the stagnation internal energy is the same as the explosively compressed gas 30A in FIG. 2. For the specific conditions stated above, this is an internal energy in air of 15,300 calories/gram. A typical chamber pressure is 3,000 atmospheres, and air with the stated energy at this pressure has a temperature of 21,000 K. At these conditions the air is fully dissociated and fully ionized. In fact, there is double ionization of the air in the settling chamber. Stated in practical terms, the air in the settling chamber 40 of the present invention is approximately 1,000 times more electrically conductive than in the standard MHD generators of the prior art which used seeding techniques as described above. Electrical conductivity of the air in the settling chamber 40 of the present invention with the conditions stated above is 22,000 mho/meter.

As illustrated in FIG. 3, the stagnated gas ruptures the frangible diaphragm 44 constructed to hold the initial loading pressure, and the gas is expanded through the nozzle assembly 42. The mechanical power flow provided by this electrically conductive gas is the primary source of electrical power for the MHD generator 60 shown in FIG. 4. For the conditions in air stated above, the power flow is 438 Megawatts per square centimeter of nozzle area. The duration of the flow is determined by the ratio of the nozzle area to the volume of the settling chamber 40.

The conversion from mechanical power to electrical power is effected by means of a magnetohydrodynamic channel 70 in the MHD generator 60 as will now be described.

Figure 4:
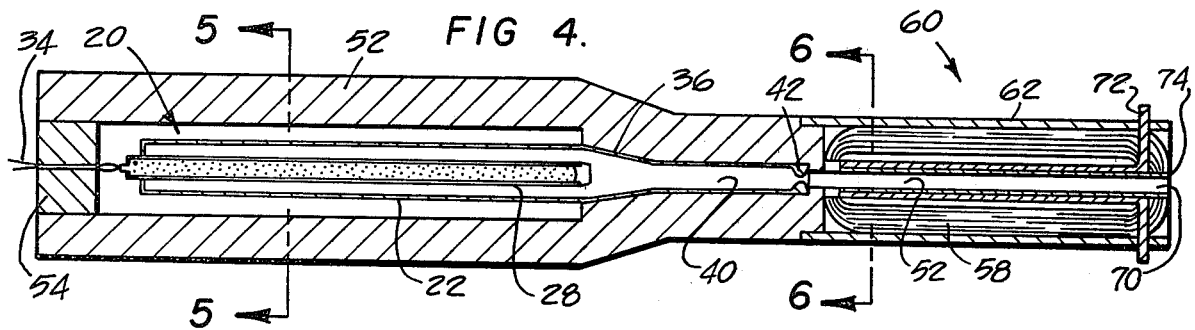
FIG. 4 is a side elevation view in cross-section of an explosive driver, like that shown in FIG. 1, combined with an MHD electrical generator in accordance with another embodiment of the present invention.
Figure 5:
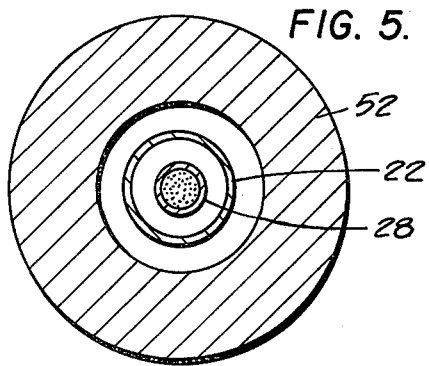
FIG. 5 is an end elevation view taken along the line and in the direction indicated by the arrows 5—5 in FIG. 4.
Figure 6:
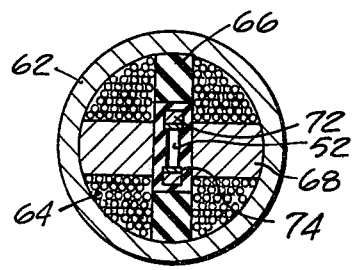
FIG. 6 is an end elevation view taken along the line and in the direction indicated by the arrows 6—6 in FIG. 4.

In the FIG. 4 embodiment of the present invention the explosive driver 20 is inserted as an expendable cartridge into a steel breech 52 and breech block 54 similar to a conventional gun.

The igniter means 34 are extended through the breech block 54 by conventional techniques.

The MHD generator 60 includes an outer pressure cylinder 62 which contains the gas pressure. The pressure cylinder 62 is either a permanent magnet or is made of hard steel and premagnetized.

The generator also includes a field coil assembly 64, non-magnetic spacers 66 and magnetic spacers 68 between the coils.

A MHD channel 70 extends axially through the MHD generator 60 and is axially aligned with the outlet of the nozzle assembly 42.

Electrical bus bars 72 extend axially along the greater portion of the length of the channel 70 and are thermally protected by erosion resistant strips 74 made of a suitable material such as graphite.

An initial or remanent magnetic field is provided in the channel 70 by the magnetic spacers 68.

In operation, as the gas initially flows out the nozzle assembly 42 it encounters this initial magnetic field and generates a current in the bus bars 72. This current is fed back through the field coil 64, and a field build-up process continues until the operating point is reached. At this time the external load (not shown) is switched into the circuit, and full power can be drawn from the MHD generator 60.

For the specific explosive driver described above using air as a working gas and composition C4 as the explosive, the output electric power is 62.5 Megawatts per square centimeter of nozzle area. The overall efficiency of the device is a product of two factors: the efficiency of explosive driver, and the efficiency of the MHD energy conversion process. For the above described conditions, the efficiency of the explosive generator is 50% in converting from explosive energy into gas energy, and the efficiency of the MHD process is 14% in converting from gas energy to electrical energy. The total conversion efficiency is therefore 7% from explosive energy (at 2.2 Megajoules per pound of explosive) into electrical energy.

The MHD efficiency can be increased by using another working gas (such as argon) which is more readily ionizable under the achieved thermodynamic conditions.

It should be noted that the embodiment shown in FIG. 4 has the advantage of building up its own magnetic field.

The present invention may be used with a variety of alternate explosively driven gas energizers. In each case the present invention generates electrical power from the stored chemical energy of an explosive. An explosive driver compresses and ionizes the gas to an electrically conductive state. The gas is processed through a settling chamber and a nozzle and is directed through a magnetohydrodynamic channel.

Figure 7:
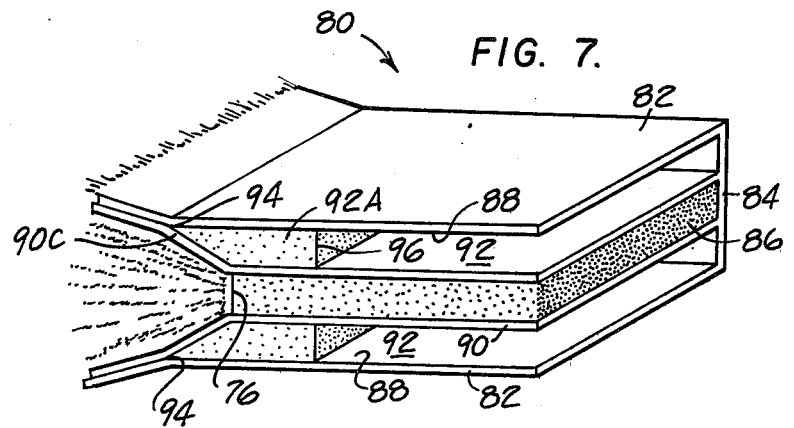
FIG. 7 is an isometric view of a rectangular shaped explosive driver constructed in accordance with another embodiment of the present invention.
Figure 8:
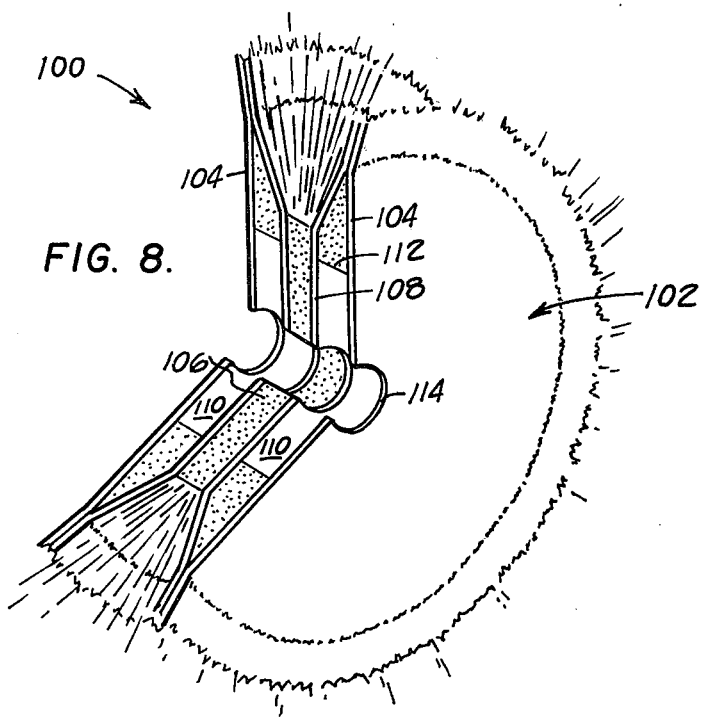
FIG. 8 is an isometric view of a disc shaped explosive drive constructed in accordance with another embodiment of the present invention.

The efficient explosive gas generator of the present invention, using the disposition of the explosive charge within the volume of gas, can be adapted to particular engineering applications, for example the planer geometry illustrated in FIG. 7 and the disc geometry illustrated in FIG. 8. These alternate geometries operate in essentially the same way as the cylindrical geometry illustrated in FIG. 1.

With particular reference to FIG. 7, the explosive driver is indicated generally by the reference numeral 80 and includes a pair of rectangular plates 82 connected at their side edges by sidewalls 84 (only one of which is shown in FIG. 7).

The explosive charge is a rectangular shaped core 86 disposed midway between the inside surfaces 88 by spacers or struts not shown.

Upper and lower flyer plates 90 extend along the top and bottom of the explosive core 86.

A volume of gaseous material 92 fills the space between the flyer plates 90 and the inside surfaces 88 of the rectangular shaped container formed by the plates 82 and 84.

When the core 86 is detonated at one end 76, the portions 90C of the flyer plates 90 are expanded outwardly at the angles illustrated in FIG. 7 so that the flyer plates impact the inside surfaces 88 in sealing engagement along the lines 94. The moving wall portions 90C then compress the gas 92 and produce a shock wave 96.

As in the cylindrical embodiment described with reference to FIGS. 1–3, the area of the volume 92A behind the shock wave is compressed and heated to a fully ionized condition.

The compressed gas is directed from the outlets ends of the plates 82 (through a converging section similar to section 36 in FIG. 1) to a settling chamber (such as the settling chamber 40 of FIG. 1).

The mode of operation of the FIG. 7 embodiment is therefore substantially the same as that described above with reference to the FIG. 1 embodiment.

FIG. 8 shows an embodiment of the present invention incorporating a disc geometry.

The explosive driver is indicated generally by the reference numeral 100 in FIG. 8 and comprises a container 102 having circular disc shaped wall plates 104.

The explosive core 106 is also disc shaped and is positioned centrally within the container 102. Flyer plates 108 are disposed on each side of the core 106 and the spaces between the flyer strips 108 and the inside surfaces of the plates 104 are filled with a gas 110.

Each flyer plate is impacted into sealing engagement with the inside surface of the related plate 104 by detonation of the explosive core as illustrated, compressing the gas and producing a shock wave 112. Because the shock wave 112 moves radially inward in the FIG. 8 embodiment, there is an additional element of gas acceleration.

Each plate 104 has a central circular opening 114. The compressed, accelerated, ionized gas flows axially outwardly through these openings 114 and into a settling chamber like the settling chamber 40 of FIG. 1, where the gas is collected at stagnation pressure before being directed through a nozzle assembly.

Figure 9:
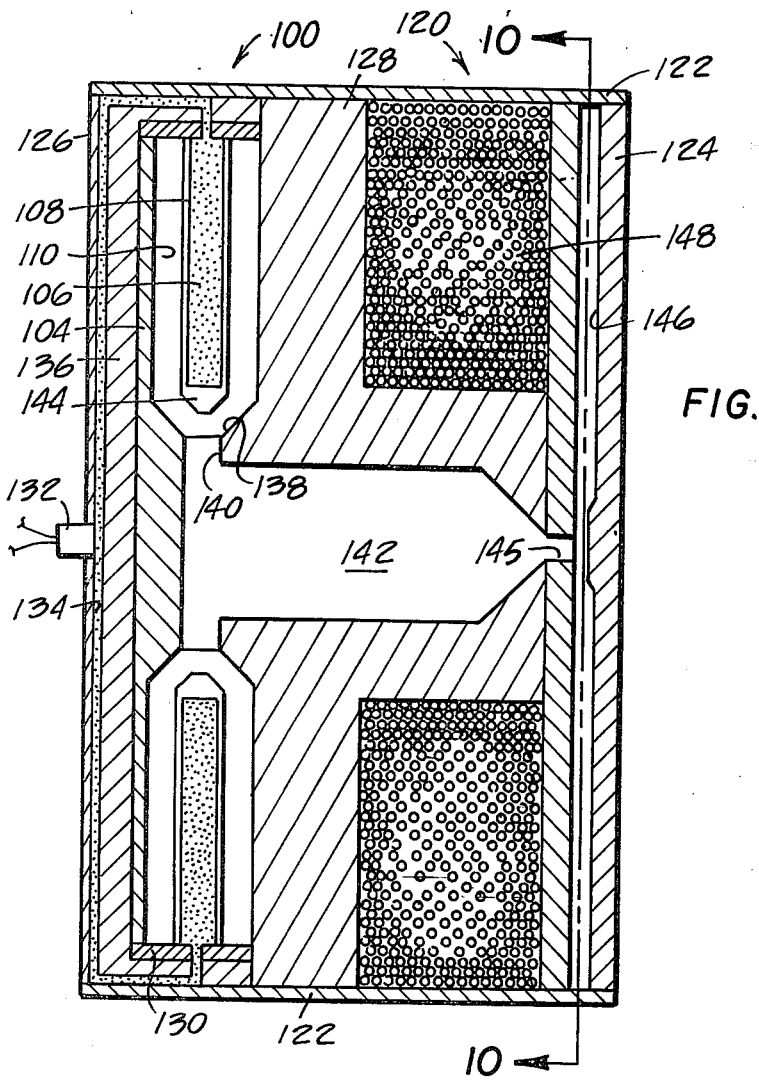
FIG. 9 is a side elevation view in cross-section of a MHD generator constructed in accordance with another embodiment of the present invention and utilizing the disc shaped explosive driver of FIG. 8.

FIG. 9 illustrates how the circular disc shaped explosive driver of FIG. 8 is combined with a MHD generator 120.

In the FIG. 9 embodiment the explosive driver 100 and the MHD generator 120 are enclosed in a common housing formed by a cylindrical sidewall 122 and circular end walls 124 and 126.

One of the sidewall plates 104 of the FIG. 8 form can be eliminated by using a common divider wall 128 as illustrated.

A cylindrically shaped breech block 130 extends around the outer periphery of the explosive core 106.

The igniter for the explosive driver 100 in the FIG. 9 form includes an electrical igniter 132 and a channel 134 in a sidewall 136. The channel 134 extends around to the outer periphery of the explosive core 106 and is filled with material providing an explosive initiation train.

Detonation of the explosive core starting on the outer periphery generates the fully ionized gas in the manner described above, and this gas is directed through a converging channel 138 to the annular inlet 140 of a settling chamber 142.

Figure 10:
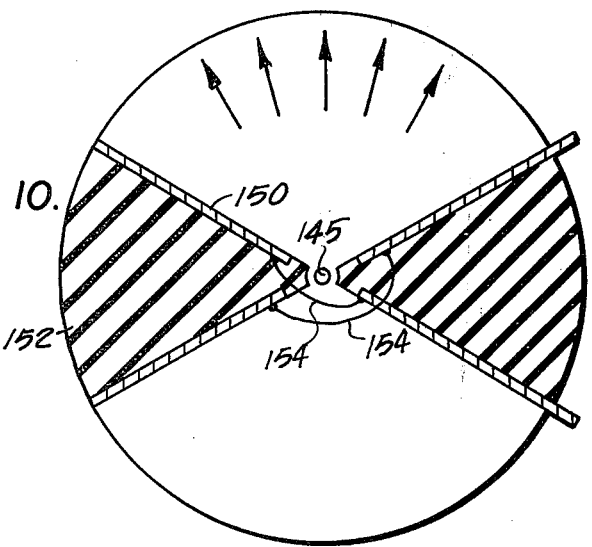
FIG. 10 is an end elevation view taken along the line and in the direction indicated by the arrows 10—10 in FIG. 9.

An annular sealing plug 144 is extruded into the channel 140 to provide a temporary gas seal at the end of the detonation. From the settling chamber the gas is directed through a nozzle 145 and into a radially extending MHD channel 146. The gas flowing in this channel 146 passes over field coils 148 and to an exhaust outlet, which is not shown in FIG. 9. Copper bus bars 150 (see FIG. 10) are spaced apart by plastic insulation 152 and are connected by electrical connectors 154 to transmit the generated power to output terminals connected to the outer ends of the bus bars.

A distinct advantage of the present invention is that the high intensity magnetic field required for extraction of electrical power from the electrically conductive working gas is self generated during operation of the device, and no external apparatus is required.

Moreover, there is great freedom in adapting the device to specific requirements of power level, voltage level, and pulse duration by straight forward selection of explosive charge weight, chamber volume, nozzle cross-sectional area, MHD channel geometry, and field coil configuration.

In addition, the device can be made very light weight and expendable, or fully contained and reusable.

The embodiments thus far described produce a pulse of power. However, the present invention also provides for repetitive firing of individual explosive cores in sequence to provide continuous power.

To those skilled in the art to which this invention relates, many changes in construction and widely differing emmbodiments and applications of the invention will suggest themselves without departing from the spirit and scope of the invention. The disclosures and the description herein are purely illustrative and are not intended to be in any sense limiting.

We claim:

1. A method of producing a flow of an electrically conductive driver working gas of the kind required for a magnetohydrodynamic electric generator, said method comprising, positioning an elongated core of an explosive inside a container, spacing one surface of the elongated core of explosive a selected distance from a related inside surface of the container, filling the space between the core and the inside surface with a working gas to be made electrically conductive, igniting the elongated core of explosive at one end edge and progressively detonating the explosive along the length of the core to the other end edge while simultaneously progressively compressing the working gas against said related inside surface of the container in the direction of detonation to an electrically conductive state and forcing the compressed gas in a flow stream along the container surface in the direction of detonation by the outward expansion of the explosive to thereby concentrate explosive energy in an intermediary driver gas having very high values of temperature and electrical conductivity.

2. The method defined in claim 1 including placing a sealing material on the surface of the core facing the fixed surface of the container and progressively moving the sealing material from the core and into sealing engagement with the surface of the container to provide a seal behind the compressed gas flow stream.

3. The invention defined in claim 2 wherein the detonation of the explosive core produces a shock wave in the gas in advance of the sealing material.

4. The invention defined in claim 2 including spacing the core between at least two opposed and inside surfaces of the container, placing expandable sealing members on at least the two opposite sides of the core facing the two inside surfaces of the container, filling the spaces between the sealing members and the related inside surfaces of the container with the gas to be made electrically conductive and processing the gas between each sealing member and the related container surface to the electrically conductive state by compression produced by the outward expansion of the sealing members and a shock wave produced in the gas on detonation of the explosive core.

5. The invention defined in claim 4 wherein the explosive core is an elongated cylindrically shaped core and the expandable sealing member encircles the cylindrical explosive core.

6. The invention defined in claim 4 wherein the explosive core is a rectangular plate shaped core.

7. The invention defined in claim 4 wherein the core is a circular disc shaped core.

8. The invention defined in claim 1 wherein the explosive core had an energy value high enough to cause the gas to be fully disassociated and fully ionized on completion of the detonation of the explosive.

9. The invention defined in claim 1 including reducing the velocity by collecting the compressed and electrically conductive gas at stagnation pressure in a settling chamber.

10. The invention defined in claim 9 including temporarily sealing the discharge end of the settling chamber to maintain a selected working pressure.

11. The invention defined in claim 10 including locating the end edge of the explosive core near the inlet end of the settling chamber, placing material for the temporary seal on that edge of the core and then moving the material from the end edge of the core to the outlet end of the settling chamber as the detonation of the core is completed.

12. The invention defined in claim 9 including expanding the gas from the settling chamber through a nozzle.

13. The invention defined in claim 12 including directing the expanded gas through a magnetohydrodynamic channel and converting the mechanical and thermal energy of the flowing gas to electrical energy.

14. The invention defined in claim 13 including building up the magnetic field by the initial flow of gas through the channel.

15. The invention defined in claim 13 including producing a continuous flow of electrical energy by repetitively detonating explosive cores in sequence and collecting the generated gases in a common settling chamber and directing the gases through said magnetohydrodynamic channel.

16. A method of generating electrical power from the stored chemical energy of an explosive, said method comprising, compressing and ionizing a gas to an electrically conductive state by an explosive driver, processing the ionized gas through a settling chamber to reduce the velocity and to collect the gas at stagnation pressure, then processing the gas through a nozzle, to control the flow rate of the gas and the duration of electrical power flow and directing the processed gas through a magnetohydrodynamic channel to convert the mechanical and thermal energy of the flowing gas to electrical energy.

17. An explosive driver for converting the stored chemical energy of an explosive into a dynamic gas flow stream and comprising,
container means having inner surfaces for containing and directing the gas flow stream,
an elongated core of explosive spaced from at least one inner surface of the container,
a sealing material on the surface of the explosive core spaced from the container inner surface,
a working gas in the space between the sealing material and said container inner surface,
and igniter means for igniting one end of the core to initiate detonation of the explosive and progressive compression and movement of the gas by outward movement of the sealing material into sealing engagement with the container inner surface along the length of the explosive core to thereby concentrate explosive energy in an intermediary driver gas having very high values of temperature and electrical conductivity.

18. The invention defined in claim 17 wherein the stored energy of the explosive is sufficiently large in relation to the volume of the gas to process the gas to a fully ionized and electrically conductive state on detonation of the explosive.

19. The invention defined in claim 18 wherein the stored energy of the explosive is sufficiently large in relation to the volume of the gas to produce a shock wave across the entire cross-section of the space between the explosive and the container inner surface on detonation of the explosive.

20. The invention defined in claim 17 including settling chamber means for collecting the gas at stagnation pressure at the end of detonation of the explosive.

21. The invention defined in claim 20 including nozzle means connected to the settling chamber means for controlling the rate of flow of gas from the settling chamber means.

22. The invention defined in claim 21 including a magnetohydrodynamic electrical generator having a channel aligned with the outlet of said nozzle means for converting the mechanical and thermal energy of the flowing gas to electrical energy.

23. The invention defined in claim 22 including sealing plug means at the end of the core opposite that ignited by the igniter means and aligned with the inlet end of the settling chamber for movement into the settling chamber at the end of detonation of the explosive core.

24. The invention defined in claim 22 wherein the container is a cylindrical container, the explosive core is a cylindrical core and is centrally positioned with and uniformly spaced from the inside surface of the cylindrical container.

25. The invention defined in claim 22 wherein the container means contain two flat wall plates and wherein the explosive core is a rectangular plate shaped core located centrally between and uniformally spaced from the inside surfaces of said container plates.

26. The invention defined in claim 22 wherein the container means include two flat disc shaped plates and wherein the explosive core is a circular disc shaped core centrally disposed between and uniformally spaced from the inside surfaces of said disc shaped plates.

27. The invention defined in claim 22 wherein the container means have a plurality of explosive cores mounted therein and wherein the igniter means include control means for igniting the individual explosive cores in sequence and the container means are connected to a common settling chamber so that the explosive cores can be repetitively fired in sequence to produce continuous power from the magnetohydrodynamic generator.

28. An electrical power generator for generating electrical power from the stored chemical energy of an explosive, said generator comprising, explosive driver means for compressing and ionizing a gas to an electrically conductive state, magnetohydrodynamic generator means including a gas flow channel for converting the mechanical and thermal energy of the ionized gas to electrical energy, and gas processing means for collecting the ionized gas from the explosive driver means and directing the gas through said flow channel said gas processing means including settling chamber means for reducing the gas flow velocity and for collecting the ionized gas at stagnation pressure and nozzle means at the outlet of the settling chamber means for controlling the flow rate of the gas and the duration of the power flow.

* * * * *